(12) United States Patent
Zou et al.

(10) Patent No.: US 11,979,271 B2
(45) Date of Patent: May 7, 2024

(54) WIRELESS COMMUNICATION DEVICE

(71) Applicant: Telefonaktiebolaget LM Ericsson (PUBL), Stockholm (SE)

(72) Inventors: Gang Zou, Lund (SE); Andreas Kristensson, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 184 days.

(21) Appl. No.: 17/775,127

(22) PCT Filed: Nov. 11, 2019

(86) PCT No.: PCT/EP2019/080778
§ 371 (c)(1),
(2) Date: May 6, 2022

(87) PCT Pub. No.: WO2021/093926
PCT Pub. Date: May 20, 2021

(65) Prior Publication Data
US 2022/0393937 A1 Dec. 8, 2022

(51) Int. Cl.
*H04L 41/06* (2022.01)
*G16Y 40/35* (2020.01)
(Continued)

(52) U.S. Cl.
CPC .......... *H04L 41/0663* (2013.01); *G16Y 40/35* (2020.01); *G16Y 40/40* (2020.01)

(58) Field of Classification Search
CPC .... H04L 41/0663; G16Y 40/35; G16Y 40/40; Y02D 30/70; H04W 52/0277; H04W 52/028; H04B 1/401
(Continued)

(56) References Cited

U.S. PATENT DOCUMENTS

2008/0272890 A1* 11/2008 Nitzan ............... H01Q 9/16
340/10.1
2009/0040022 A1* 2/2009 Finkenzeller ...... G06K 19/0712
340/572.2
(Continued)

FOREIGN PATENT DOCUMENTS

WO 00/10270 A1 2/2000

OTHER PUBLICATIONS

Min Tang et al., A Compact DC—20 GHz SPDT Switch Circuit Using Lateral RF MEMS Switches, APMC2005 Proceedings, IEEE—2005.
(Continued)

*Primary Examiner* — Omar Casillashernandez
(74) *Attorney, Agent, or Firm* — Baker Botts L.L.P.

(57) ABSTRACT

A wireless communication device comprises: an antenna; a radio frequency transceiver, for generating signals for transmission through the antenna, the radio frequency transceiver being connectable to the antenna through a switch; a backscattering block, for generating reflected signals for transmission through the antenna in response to received RF signals, the backscattering block being connectable to the antenna through said switch; and a battery. The switch is controlled by an output voltage of the battery, such that the radio frequency transceiver is connected to the antenna through the switch when the output voltage of the battery
(Continued)

exceeds a threshold voltage, and the backscattering block is connected to the antenna through the switch when the output voltage of the battery is below the threshold voltage.

8 Claims, 7 Drawing Sheets

(51) Int. Cl.
  *G16Y 40/40* (2020.01)
  *H04L 41/0663* (2022.01)
(58) Field of Classification Search
  USPC ........................................................ 340/10.1
  See application file for complete search history.

(56) References Cited

U.S. PATENT DOCUMENTS

| | | | |
|---|---|---|---|
| 2009/0045916 A1* | 2/2009 | Nitzan | G06K 19/0723 340/10.1 |
| 2015/0318881 A1 | 11/2015 | Barott | |
| 2016/0165554 A1 | 6/2016 | Grubis | |
| 2016/0192168 A1 | 6/2016 | Lee et al. | |
| 2016/0365890 A1* | 12/2016 | Reynolds | H04B 1/10 |
| 2017/0281060 A1 | 10/2017 | Wedekind et al. | |

OTHER PUBLICATIONS

Giovanni Vannucci et al., A Software-Defined Radio System for Backscatter Sensor Networks, IEEE Transactions on Wireless Communications, vol. 7, No. 6—Jun. 2008.

Manikanta Kotaru et al., Localizing Low-power Backscatter Tags Using Commodity WiFi—2017.

Maxim, 28V Internal Switch LCD Bias Supply with True Shutdown, 2004 Maxim Integrated Products—2004.

PCT International Search Report issued for International application No. PCT/EP2019/080778—dated Aug. 4, 2020.

T. Ketterl and T. Weller, SPDT RF MEMS Switch Using a Single Bias Voltage and Based on Dual Series and Shunt Capacitive MEMS Switches—2005.

Lei Yang et al., Tagoram: Real-Time Tracking of Mobile RFID Tags to High Precision Using COTS Devices—Sep. 2014.

PCT Written Opinion of the International Searching Authority issued for International application No. PCT/EP2019/080778—dated Aug. 4, 2020.

* cited by examiner

WIRELESS COMMUNICATION DEVICE

PRIORITY

This nonprovisional application is a U.S. National Stage Filing under 35 U.S.C. § 371 of International Patent Application Serial No. PCT/EP2019/080778 filed Nov. 11, 2019 and entitled "WIRELESS COMMUNICATION DEVICE" which is hereby incorporated by reference in its entirety.

TECHNICAL FIELD

This relates to a wireless communication device, and in particular to a battery-powered device that can communicate using radio frequency signals, and can act as a backscatter device when the battery is unable to power the radio frequency communication.

BACKGROUND

Battery-powered wireless communication devices are in widespread use.

One class of battery-powered wireless communication devices includes devices that may be put into service without regular human supervision. For example, the Internet of Things (IoT) may include devices that are deployed on electrical devices in the home, in order to send reports on the operation of the devices to a central location. The Internet of Things may also include devices that include sensors, in order to report the sensor data to a central location, for example from a remote location.

The IoT devices may be provided at fixed locations or may be intended to be mobile.

A conventional IoT device contains sensors, a micro-controller to process sensor data and perform control tasks, a baseband circuit to encode radio frequency (RF) signals based on the sensor data and to decode received RF signals, and a radio circuit to transmit and receive the RF signals. A battery is provided to supply power for these components, and, in general, the radio transceiver requires more power than the other components.

During the lifetime of an IoT device, electrical energy is continuously drawn from the battery, and so the remaining capacity of the battery will decrease over time. When its capacity is lower than a certain level, the battery cannot supply enough power to keep the radio transceiver functional. As a result, the IoT device cannot transmit or receive radio signals, even though the micro-controller and sensors may still be able to function.

If it is not possible to retrieve these dead IoT devices, both the battery and the electronics they contain can become an environmental hazard.

Separately, for example from US2015/0318881, it is known to provide devices that operate by backscattering, that is, by generating and transmitting reflected signals in response to received RF signals. However, it would be disadvantageous to operate the backscattering function while the radio circuit is operating to transmit and receive the RF signals.

SUMMARY

According to a first aspect, there is provided a wireless communication device. The wireless communication device comprises an antenna and a radio frequency transceiver, for generating signals for transmission through the antenna. The radio frequency transceiver is connectable to the antenna through a switch. The wireless communication device further comprises a backscattering block, for generating reflected signals for transmission through the antenna in response to received RF signals. The backscattering block is connectable to the antenna through the switch. The wireless communication device further comprises a battery. The switch is controlled by an output voltage of the battery, such that the radio frequency transceiver is connected to the antenna through the switch when the output voltage of the battery exceeds a threshold voltage, and the backscattering block is connected to the antenna through the switch when the output voltage of the battery is below the threshold voltage.

The switch may comprise first and second transistors, with a conductive path of the first transistor being connected between the radio frequency transceiver and the antenna, and a conductive path of the second transistor being connected between the backscattering block and the antenna. In that case, the first transistor is turned on and the second transistor is turned off when the output voltage of the battery exceeds the threshold voltage, and the first transistor is turned off and the second transistor is turned on when the output voltage of the battery is below the threshold voltage.

The wireless communication device may further comprise first and second operational amplifiers. In that case, the output voltage of the battery may be applied to a non-inverting input of the first operational amplifier, the threshold voltage may be applied to an inverting input of the first operational amplifier, an output voltage of the first operational amplifier may control the first transistor, the output voltage of the first operational amplifier may be applied to an inverting input of the second operational amplifier, a non-inverting input of the second operational amplifier may be connected to ground, and an output voltage of the second operational amplifier may control the second transistor.

The switch may comprise a single-pole, double-throw MEMS switch, wherein the output voltage of the battery is applied to the switch as a bias voltage, such that the radio frequency transceiver is connected to the antenna through the switch when the output voltage of the battery exceeds a threshold voltage, and the backscattering block is connected to the antenna through the switch when the output voltage of the battery is below the threshold voltage.

The wireless communication device may further comprise a controller, wherein the controller is configured for modulating signals generated by the backscattering block based on data for transmission, when the backscattering block is connected to the antenna through the switch.

The data for transmission may comprise data indicating a status of the device.

The data for transmission may comprise data collected by one or more sensor on the device.

The switch may be controlled by hardware in response to an output voltage of the battery.

Implementing a backscatter transmitter in a battery-powered wireless communication device has the advantage that the IoT device can be located when the battery is no longer providing enough power to operate the radio circuit. A simple hardware circuit is used to control the switching from the main RF circuit to the backscatter circuit. This allows a device that is no longer fully operational to be located and retrieved, without damage to the environment.

BRIEF DESCRIPTION OF THE DRAWINGS

For a better understanding of the invention, and to show how it may be put into effect, reference will now be made, by way of example, to the accompanying drawings, in which:—

DETAILED DESCRIPTION

Figure 1:
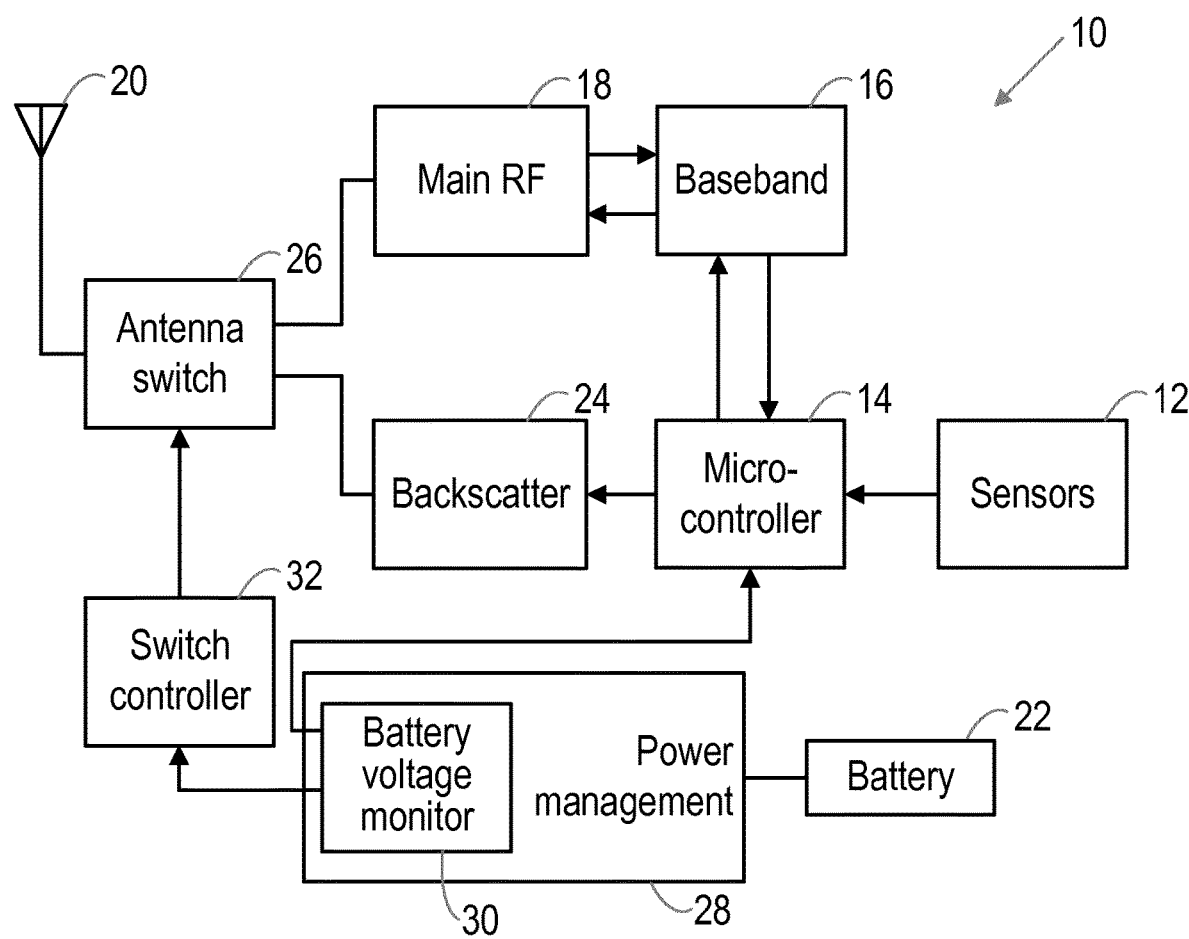
FIG. 1 illustrates the form of a wireless communication device.

FIG. 1 is a block diagram illustrating a wireless communication device 10. In one example, the wireless communication device is an Internet of Things (IoT) device.

The device 10 includes one or more sensor 12, and a micro-controller 14. The micro-controller 14 is used to collect data from the sensor(s) 12. The micro-controller 14 is also used as a control unit in the IoT device.

Sensor data received by the micro-controller 14 from the sensor(s) 12 can be sent to digital baseband circuitry 16, and then to a radio frequency (RF) transceiver circuit 18. The RF transceiver circuit may be connected to an antenna 20 so that the sensor data can be transmitted over a wireless communications interface, for example to a central device that receives sensor data from multiple IoT devices. Signals received by the antenna 20 can also be passed to the RF transceiver circuit 18, and then to the baseband circuitry 16 and the micro-controller 14.

The digital baseband circuitry 16 and RF transceiver 18 can be configured to operate using any suitable form of radio communication, including any desired form of radio access technology, such as cellular technology, for example as standardised by 3GPP, WiFi, or a short-range wireless technology such as Bluetooth.

The circuitry, including the micro-controller 14, the digital baseband circuitry 16, and the RF transceiver circuit 18, is powered by a battery 22.

The device 10 also includes a backscattering block 24, which may also be connected to the antenna 20.

As discussed in more detail below, an antenna switch 26 is connected to the antenna 20, such that only one of the RF transceiver circuit 18 and the backscattering block 24 is connected to the antenna 20 at any one time.

More specifically, a power management block 28, including a battery voltage monitor 30, is connected to the battery 22, in order to monitor an output voltage of the battery 22. The power management block 28 is connected to a switch controller 32, in order to control the operation of the antenna switch 26.

When the output voltage of the battery 22 remains above a threshold level, the switch controller 32 controls the operation of the antenna switch 26 so that the RF transceiver circuit 18 is connected to the antenna 20. The threshold voltage level may be set such that it corresponds to a voltage that is sufficient for the operation of the micro-controller 14, the digital baseband circuitry 16, and the RF transceiver circuit 18. As mentioned above, it is usually the RF transceiver circuit 18 that requires the most power. However, when the output voltage of the battery 22 falls below the threshold level, meaning that the RF transceiver circuit 18 can no longer operate as intended, the switch controller 32 controls the operation of the antenna switch 26 so that the backscattering block 24 is connected to the antenna 20.

Figure 2:
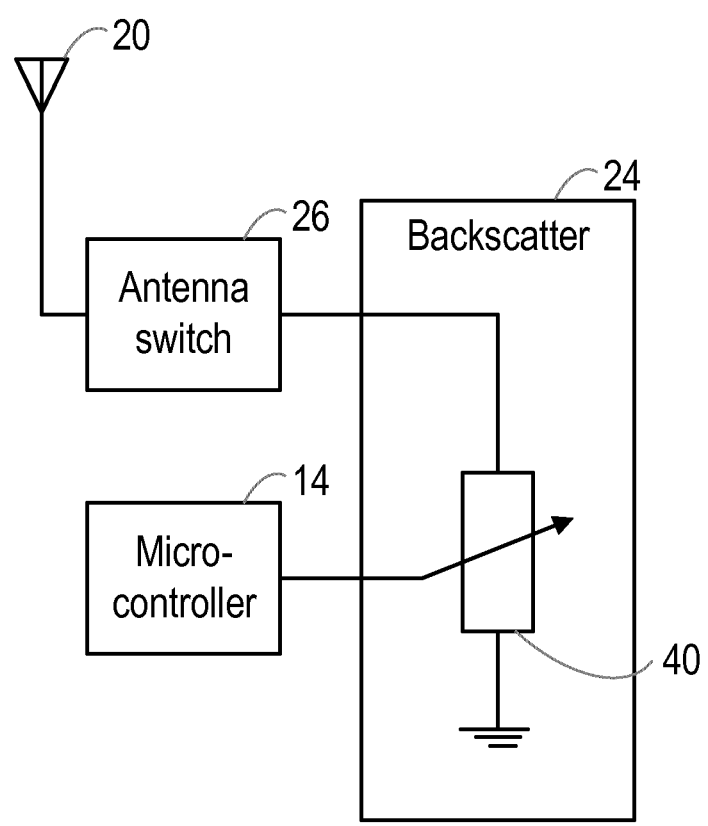
FIG. 2 illustrates a first part of the wireless communication device of FIG. 1.

FIG. 2 shows in more detail the general form of the backscattering block 24.

The backscattering block 24 operates by detecting a radio frequency wave, which may for example be transmitted by a hub device, and reflecting a fraction of the detected wave back to the hub. The wave reflection occurs due to an intentional mismatch between the antenna impedance and a load impedance of the backscattering block.

Varying the load impedance varies the property of reflection, and so the reflected wave may be modulated with data to be transmitted.

Figure 4:
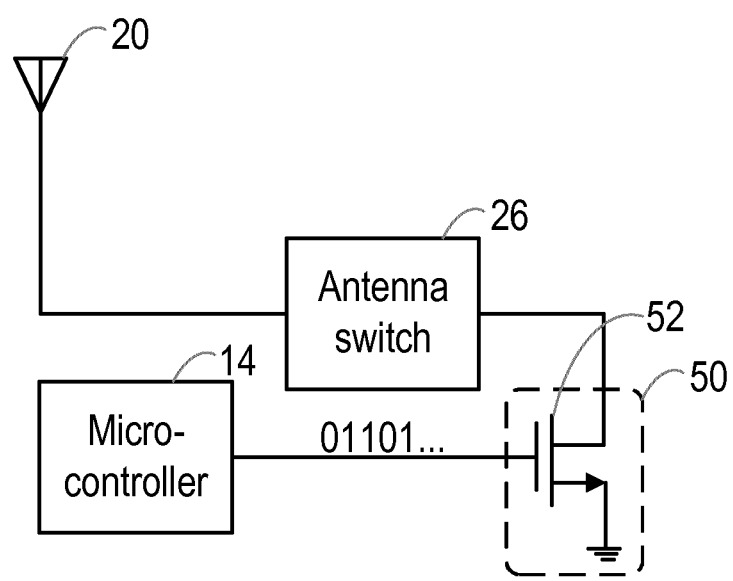
FIG. 4 illustrates in more detail an alternative form of the first part of the wireless communication device of FIG. 1.

This is shown in general terms in FIG. 4, which shows the backscattering block 24 including an impedance 40, the impedance value of which may be varied under the control of the micro-controller 14.

Thus, by switching the value of the load impedance 40 between different values, data can be modulated onto the reflected signal.

In other embodiments, the backscattering block 24 may modulate the data with a subcarrier to shift the incoming signals by the frequency of the subcarrier and backscatter the frequency-shifted signal.

Figure 3:
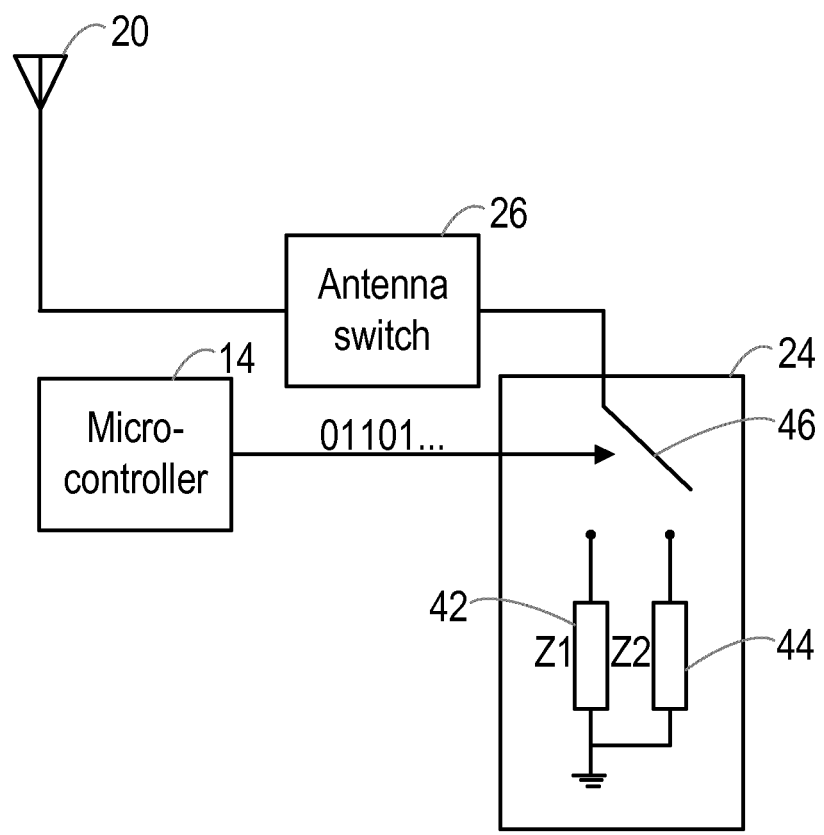
FIG. 3 illustrates in more detail the first part of the wireless communication device of FIG. 1.

FIG. 3 shows a more specific example of the general structure shown in FIG. 2. In FIG. 3, two impedances 42, 44, with impedance values Z1 and Z2, are connected in parallel between a switch 46 and ground. The switch is controlled by the micro-controller 14.

Thus, when the micro-controller 14 controls the switch 46 so that the impedance 42 is connected to the antenna switch 26, the load impedance of the backscattering block 24 has the impedance value Z1. When the micro-controller 14 controls the switch 46 so that the impedance 44 is connected to the antenna switch 26, the load impedance of the backscattering block 24 has the impedance value Z2.

FIG. 4 shows an alternative more specific example of the general structure shown in FIG. 2. In FIG. 4, the backscattering circuit 50 takes the form of a field effect transistor (FET) 52 connected between the antenna switch 26 and ground. The gate of the FET 52 is connected to receive a data signal generated by the micro-controller 14.

Thus, when the micro-controller 14 generates a data 1, the FET 52 is turned ON, and the antenna load impedance of the backscattering block 24 is close to zero. When the micro-controller 14 generates a data 0, the FET 52 is turned OFF, and the antenna load impedance of the backscattering block 24 is effectively infinite.

Thus, in these embodiments, the load impedance presented by the backscattering block can be controlled by the micro-controller 14, allowing data to be contained within the reflected signals.

As mentioned above, the antenna switch 26 is connected to the antenna 20, such that only one of the RF transceiver circuit 18 and the backscattering block 24 is connected to the antenna 20 at any one time. More specifically, the power management block 28 is connected to a switch controller 32, in order to control the operation of the antenna switch 26. When the output voltage of the battery 22 remains above a threshold level, the switch controller 32 controls the operation of the antenna switch 26 so that the RF transceiver circuit 18 is connected to the antenna 20, but when the output voltage of the battery 22 falls below the threshold level, the switch controller 32 controls the operation of the antenna switch 26 so that the backscattering block 24 is connected to the antenna 20.

Figure 5:
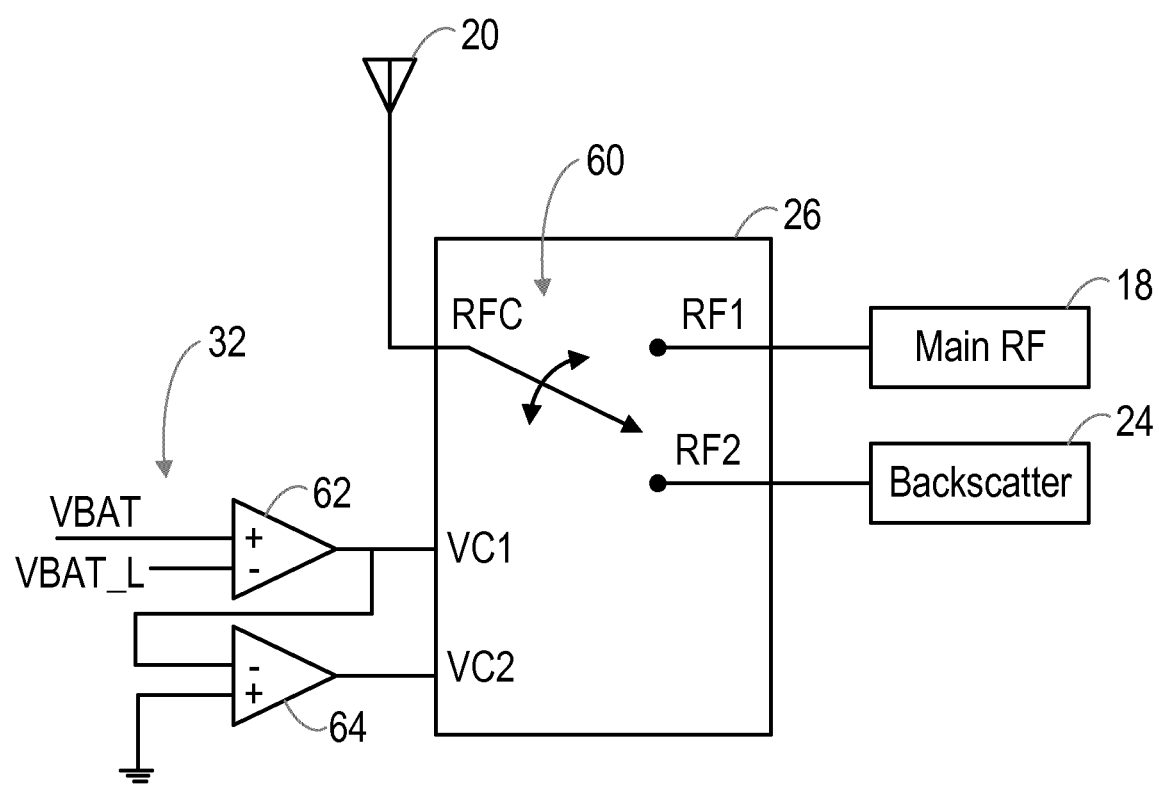
FIG. 5 illustrates a second part of the wireless communication device of FIG. 1.

FIG. 5 shows a first embodiment of an antenna switch 26, connected so that either the main RF circuitry 18 or the backscattering block 24 can be connected to the antenna 20.

In this example, the antenna switch 26 includes a single pole double throw (SP2T) RF switch 60, with a first terminal RF1 connected to the RF circuitry 18, a second terminal RF2 connected to the backscattering block 24, and a third terminal RFC connected to the antenna 20.

In this embodiment, a hardware circuit containing two operational amplifiers (op-amps) 62, 64 acts as the antenna switch controller 32. The battery voltage VBAT acts as an input to the switch controller 32.

More specifically, the battery voltage VBAT is provided as an input to the non-inverting input terminal of a first op-amp 62, while a threshold voltage VBAT_L is provided as an input to the inverting input terminal of the first op-amp 62. The output of the first op-amp 62 is provided as a first control input VC1 to the switch controller 32, and is also provided as an input to the inverting input terminal of the second op-amp 64. The non-inverting input terminal of the second op-amp 64 is connected to ground. The output of the second op-amp 64 is provided as a second control input VC2 to the switch controller 32.

Thus, when the battery voltage VBAT is higher than the threshold voltage VBAT_L, the output of the first op-amp 62 is HIGH, that is VC1 is HIGH. The second op-amp 64 acts as an inverter, and so its output is LOW, that is VC2 is LOW. Conversely, when the battery voltage VBAT is lower than the threshold voltage VBAT_L, the output of the first op-amp 62 is LOW, that is VC1 is LOW. The second op-amp 64 acts as an inverter, and so its output is HIGH, that is VC2 is HIGH.

Figure 6:
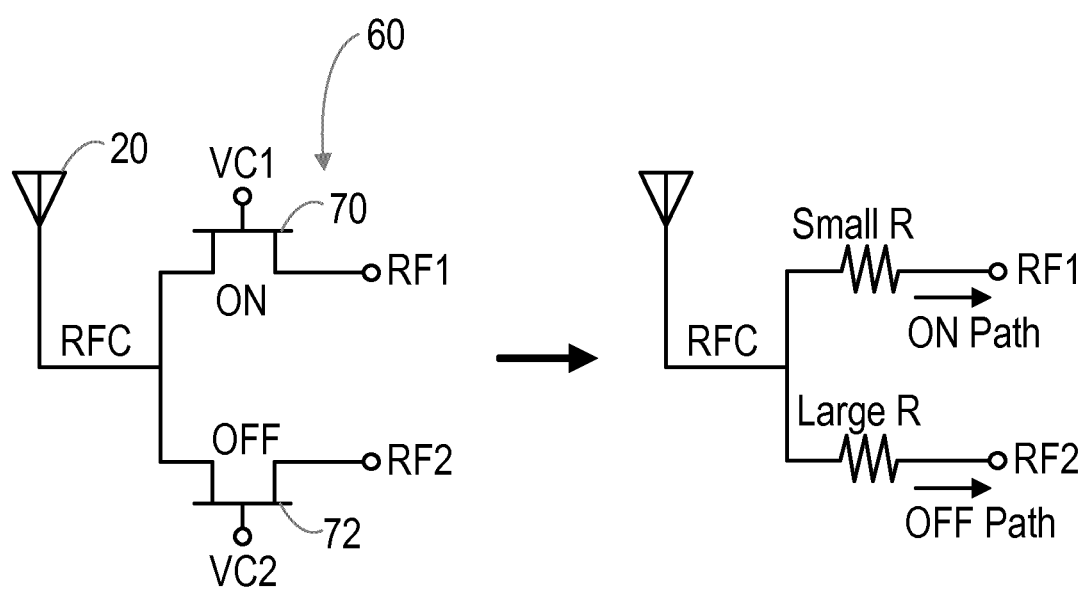
FIG. 6 illustrates in more detail the second part of the wireless communication device of FIG. 1.

FIG. 6 shows in more detail one possible form of the SP2T switch 60. Specifically, in this embodiment, the switch 60 comprises a first FET 70, with its conductive path connected between the first terminal RF1 and the third terminal RFC of the switch 60, and its gate terminal controlled by the first control input voltage VC1. The switch 60 also comprises a second FET 72, with its conductive path connected between the second terminal RF2 and the third terminal RFC of the switch 60, and its gate terminal controlled by the second control input voltage VC2.

FIG. 6 shows the situation where VBAT is higher than the threshold voltage VBAT_L, and so VC1 is HIGH and VC2 is LOW. This means that the first FET 70 has a small resistance and the second FET 72 has a large resistance, and hence that the path between the first terminal RF1 and the third terminal RFC of the switch 60 is turned ON, and the path between the second terminal RF2 and the third terminal RFC is turned OFF.

Thus, the RF circuitry 18 is connected to the antenna 20 while the battery voltage is high enough to allow the RF circuitry to operate successfully.

Conversely, when VBAT is lower than the threshold voltage VBAT_L, VC1 is LOW and VC2 is HIGH. This means that the first FET 70 has a large resistance and the second FET 72 has a small resistance, and hence that the path between the first terminal RF1 and the third terminal RFC of the switch 60 is turned OFF, and the path between the second terminal RF2 and the third terminal RFC is turned ON.

Thus, the backscattering block 24 is connected to the antenna 20 when the battery voltage is no longer high enough to allow the RF circuitry to operate successfully.

The following table shows the logical operation of the switch 60.

| VC1 | VC2 | RFC-RF1 | RFC-RF2 |
|---|---|---|---|
| High | Low | ON | OFF |
| Low | High | OFF | ON |

Figure 7:
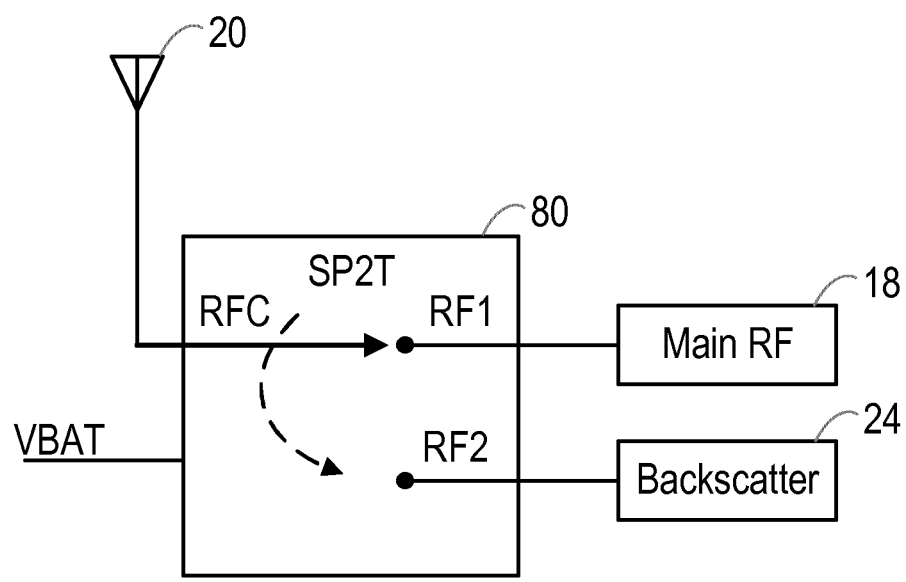
FIG. 7 illustrates an alternative form of the second part of the wireless communication device of FIG. 1.

FIG. 7 shows a second embodiment of an antenna switch 26, again connected so that either the main RF circuitry 18 or the backscattering block 24 can be connected to the antenna 20.

In this example, the antenna switch 26 includes a SP2T microelectromechanical system (MEMS) switch 80, with a first terminal RF1 connected to the RF circuitry 18, a second terminal RF2 connected to the backscattering block 24, and a third terminal RFC connected to the antenna 20. For example, the SP2T MEMS switch 80 may be as disclosed in "SPDT RF MEMS Switch Using A Single Bias Voltage And Based On Dual Series And Shunt Capacitive MEMS Switches", T. Ketterl and T. Weller, 2005 European Microwave Conference, or in "A Compact DC—20 GHz SPDT Switch Circuit Using Lateral RF MEMS Switches", M. Tang, A. Liu, A. Agarwal, 2005 Asia-Pacific Microwave Conference Proceedings.

In this example, the antenna switch is controlled directly from the battery voltage VBAT, although in other embodiments a voltage boost circuit (for example the MAX1606 step-up DC-DC converter) may be needed to convert the battery voltage to the bias voltage required by the MEMS switch.

In normal operation mode, with VBAT higher than a threshold (for example 0.5V), the MEMS switch 80 is in the ON state, and so the path between the first terminal RF1 and the third terminal RFC of the switch 80 is turned ON, and the path between the second terminal RF2 and the third terminal RFC is turned OFF. Thus, the RF circuitry 18 is connected to the antenna 20.

When VBAT falls lower than the threshold, the bias voltage is no longer sufficient to keep the MEMS switch 80 in the ON state. As a result, the connection to the antenna is switched from the RF transceiver circuitry 18 to the backscattering block 24.

Thus, the antenna switch operates so that the radio frequency transceiver is connected to the antenna through the switch when the output voltage of the battery exceeds a threshold voltage, and the backscattering block is connected to the antenna through the switch when the output voltage of the battery is below the threshold voltage.

When the backscattering block 24 is connected to the antenna 20, the micro-controller 14 can modulate the backscattered signal by some data.

For example, in some situations the micro-controller 14 can continue to obtain sensor data and send the data via the modulated backscattered signal, or can transmit data that the RF circuitry was unable to transmit.

As another example, the micro-controller can modulate the backscattered signal with an error code to report the reason why the RF circuitry is not connected, for example an error code corresponding to a low battery voltage.

As another example, the micro-controller can modulate the backscattered signal with information relating to the location of the device, allowing the device to be retrieved if required.

The IoT device can report information about any aspect of its status, for example its battery voltage, to an access point by means of the backscattered signal.

There is thus described a battery-powered device where a main RF circuit is used to transmit and/or receive data. An RF backscattering circuit is disconnected when the main RF circuit is functional but, once the device is unable to function normally because of a low battery level, the backscatter transmitter is enabled by hardware.

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A wireless communication device, comprising:
an antenna;
a radio frequency transceiver, for generating signals for transmission through the antenna, the radio frequency transceiver being connectable to the antenna through a switch;
a backscattering block, for generating reflected signals for transmission through the antenna in response to received RF signals, the backscattering block being connectable to the antenna through said switch; and
a battery,
wherein the switch is controlled by an output voltage of the battery, such that the radio frequency transceiver is connected to the antenna through the switch when the output voltage of the battery exceeds a threshold voltage, and the backscattering block is connected to the antenna through the switch when the output voltage of the battery is below the threshold voltage.

2. A wireless communication device according to claim 1, wherein the switch comprises first and second transistors, with a conductive path of the first transistor being connected between the radio frequency transceiver and the antenna, and a conductive path of the second transistor being connected between the backscattering block and the antenna,
wherein the first transistor is turned on and the second transistor is turned off when the output voltage of the battery exceeds the threshold voltage, and
wherein the first transistor is turned off and the second transistor is turned on when the output voltage of the battery is below the threshold voltage.

3. A wireless communication device according to claim 2, further comprising first and second operational amplifiers,
wherein the output voltage of the battery is applied to a non-inverting input of the first operational amplifier,
wherein the threshold voltage is applied to an inverting input of the first operational amplifier, and
wherein an output voltage of the first operational amplifier controls the first transistor, and
wherein the output voltage of the first operational amplifier is applied to an inverting input of the second operational amplifier,
wherein a non-inverting input of the second operational amplifier is connected to ground, and
wherein an output voltage of the second operational amplifier controls the second transistor.

4. A wireless communication device according to claim 1, wherein the switch comprises a single-pole, double-throw MEMS switch, wherein the output voltage of the battery is applied to the switch as a bias voltage, such that the radio frequency transceiver is connected to the antenna through the switch when the output voltage of the battery exceeds a threshold voltage, and the backscattering block is connected to the antenna through the switch when the output voltage of the battery is below the threshold voltage.

5. A wireless communication device according to claim 1, further comprising a controller, wherein the controller is configured for modulating signals generated by the backscattering block based on data for transmission, when the backscattering block is connected to the antenna through the switch.

6. A wireless communication device according to claim 5, wherein the data for transmission comprises data indicating a status of the device.

7. A wireless communication device according to claim 5, wherein the data for transmission comprises data collected by one or more sensor on the device.

8. A wireless communication device according to claim 1, wherein the switch is controlled by hardware in response to an output voltage of the battery.

* * * * *